(12) United States Patent
Genossar et al.

(10) Patent No.: US 6,643,321 B1
(45) Date of Patent: Nov. 4, 2003

(54) METHOD FOR RAPID SYNCHRONIZATION OF A POINT TO MULTIPOINT COMMUNICATION SYSTEM

(75) Inventors: Michael Joshua Genossar, Rosh Ha'ayin (IL); Natan Mizrahi, Tel Aviv (IL); Max Gotman, Kfar Saba (IL); Naftali Chayat, Kfar Saba (IL)

(73) Assignee: Alvarion Ltd., Tel Aviv (IL)

( * ) Notice: Subject to any disclaimer, the term of this patent is extended or adjusted under 35 U.S.C. 154(b) by 0 days.

(21) Appl. No.: 09/162,995

(22) Filed: Sep. 30, 1998

(51) Int. Cl.[7] .................................................. H04B 1/38
(52) U.S. Cl. ........................ 375/219; 375/295; 375/373
(58) Field of Search ................................ 375/295, 298, 375/316, 326, 325, 373, 371, 375, 354, 355, 356, 362, 365, 368, 344, 345, 219

(56) References Cited

U.S. PATENT DOCUMENTS

| | | | |
|---|---|---|---|
| 4,817,114 A | | 3/1989 | Boer et al. |
| 4,847,880 A | | 7/1989 | Kamerman et al. |
| 5,793,821 A | * | 8/1998 | Norrell et al. ............... 375/326 |
| 6,088,368 A | * | 7/2000 | Rubinstain et al. ......... 370/206 |

OTHER PUBLICATIONS

Adaptive Signal Processing, B. Widrow and S. D. Stearns, Prentice Hall, Englewood Cliffs, New Jersey, Chapter 6, pp. 99–116.

The Theory and Practice of Modem Design, J. A. C. Bingham, John Wiley and Sons, New York, Chapter 7, pp. 189–236.

Adaptive Equalization, S. U. H. Qureshi, Proceedings of the IEEE, vol. 73, No. 9, Sep. 1985, pp. 1349–1387.

Passband timing recovery in an all-digital modem receiver, D. N. Godard, IEEE Transactions on Communications, vol. COM–26, No. 5, May 1978, pp. 517–523.

* cited by examiner

Primary Examiner—Chi Pham
Assistant Examiner—Pankaj Kumar
(74) Attorney, Agent, or Firm—Mark M. Friedman

(57) ABSTRACT

A modem for more efficiently processing a received analog signal into a digital output. The modem preferably features an adaptive equalizer with coefficients which are saved and reused for processing of subsequent analog signals, in order to reduce the time required to reach convergence. In addition, preferably the modem features an automatic carrier frequency control which adjusts the sampled digital signal according to both the carrier phase offset and the carrier frequency offset. Again, in order to process the signal more quickly and efficiently, preferably the carrier frequency offset is stored and reused for processing subsequent signals.

14 Claims, 10 Drawing Sheets

METHOD FOR RAPID SYNCHRONIZATION OF A POINT TO MULTIPOINT COMMUNICATION SYSTEM

FIELD AND BACKGROUND OF THE INVENTION

The present invention relates to a method for rapid synchronization of a point to multipoint modem system and, in particular, to a method for increasing the efficiency of processing of a received signal by storing the carrier frequency offset and equalizer taps between processing of burst transmissions.

Many different types of communication systems feature a master modem, at a base station, which then controls the transmissions of a plurality of slave modems, at terminal stations. For example, such a communication system is often used for wireless communication according to a TDM (time division multiplexing) protocol, an FDD (frequency division duplex) protocol and a TDMA (time division multiple access) protocol. Transmission from the base station to the terminal stations for the downstream transmissions is performed at one carrier frequency, and transmissions from the terminal stations to the base station, or upstream transmissions, are performed at another frequency, such that the downstream and upstream transmissions do not interfere with each other. For upstream transmissions from the terminal stations to the base station, communication follows the TDMA protocol. Downstream transmissions, however, are continuous and are performed according to the TDM protocol, for example. The base station determines the timing of transmissions by the terminal stations. In order for communication to occur, a transmitted signal must be accurately processed by the receiver for accurate recovery of the information contained within the signal.

For example, radio frequency signals are subject to distortion such as amplitude and phase distortion, carrier frequency offset and phase noise. Amplitude and phase distortion, which cause time dispersion, are known as channel response. The transmission frame may include synchronization fields, which are required for correct processing of the frame to overcome the above-mentioned distortions, yet which must be minimized in order to maximize the available bandwidth. In the upstream direction, due to the bursty nature of the transmission, every burst must include synchronization fields. For example, these fields may appear at the beginning of the burst, and then they form the header. When bursts are relatively short, the synchronization overhead must be decreased as much as possible, such that the synchronization fields must be as short as is practical.

One typical approach to compensate for channel response (amplitude and phase distortion and time dispersion of the signal) in a receiver is an equalizer. The equalizer includes a plurality of "taps", each of which has an associated equalizer coefficient, with a delay separating each tap. The equalizer coefficients may be calculated using an iterative approach, where the coefficients are adjusted until the coefficients converge acccording to some algorithm, such as LMS (least mean squares) (see for example chapter 6 of Adaptive Signal Processing, by. B. Widrow and S. D. Stearns, Prentice-Hall, Inc., Englewood Cliffs, N.J., USA, 1985). Since the channel response is typically time variant for wireless communication, equalizers are usually adaptive, such that the equalizer coefficients are varied over time to be able to track the changes in the channel response. The rate at which the equalizer coefficients are adjusted depends upon the rate at which the channel response varies over time. Typically for background art equalizers for wireless communication according to TDMA, the equalizer coefficients are adjusted for each burst alone, without reference to any previous burst, which requires longer synchronization fields and lengthier calculations.

One example of a system which attempts to increase the speed for signal processing is disclosed in U.S. Pat. No. 4,847,880. The disclosed system stores certain equalizer coefficients for one initial training session, and then uses these stored coefficients for all subsequent equalizations of the signal. The equalizer coefficients are not updated at any later time. This approach is only suitable for a channel which is not varying. Thus, the storage of these coefficients is used to increase the efficiency of processing, but is inoperative for a time varying channel, such as for wireless communication.

However, for certain types of applications, in particular fixed systems in which both the base station and the terminal stations are stationary, various values calculated during the signal processing change relatively slowly between consecutive bursts, but these values are still time variant. For example, the equalizer coefficients typically do not change significantly between bursts. Therefore, using the values obtained from the calculation of equalizer coefficients for a previous burst transmission as the basis for the calculation for a subsequent consecutive burst from the same terminal station, rather than starting from a random or otherwise unrelated value, could significantly improve the efficiency of the equalizer coefficient adaptation. Unfortunately, no currently available system takes advantage of those receiver parameters which change relatively slowly.

There is thus a widely recognized need for, and it would be highly advantageous to have, a system and a method for storing certain relatively slowly changing receiver parameters between transmissions for signal processing, such as the equalizer coefficients and the carrier frequency offset, in order to increase the efficiency of signal processing, and decrease the length of synchronization fields, thereby maximizing available bandwidth.

SUMMARY OF THE INVENTION

According to the present invention, there is provided a system for communication between a base station and at least one terminal station, the base station receiving a plurality of sequentially transmitted bursts from the at least one terminal station according to a TDMA (time division multiple access) protocol, each burst featuring a synchronization portion, each of the plurality of sequentially transmitted bursts being denoted $S_i$ wherein i is an integer, the plurality of sequentially transmitted bursts including at least a burst $S_m$ and a burst $S_n$ being sent from one terminal station, wherein m and n are each integers and m<n, the system comprising: a base station transceiver comprising: (i) a receiver unit for receiving the plurality of bursts $S_i$, including at least the burst $S_m$ and the burst $S_n$, and for producing each of a plurality of analog signals from each of the plurality of bursts $S_i$; (ii) an analog-to-digital converter for converting each analog signal to a sampled digital signal, by sampling each analog signal according to a sampling timing; (iii) an adaptive equalizer for equalizing each sampled digital signal according to each of a plurality of sets of equalizer coefficients to produce an equalized signal, such that a sampled digital signal corresponding to a particular burst $S_i$ is equalized according to a particular set of equalizer coefficients; and (iv) an equalizer controller for determining each set of coefficients by processing a portion of an equalized signal corresponding to the synchronization portion of a burst $S_i$ according to an initialized coefficient adjustment procedure; such that for processing a portion of an equalized signal corresponding to the synchronization portion of the burst $S_n$, the initialized coefficient adjustment procedure is initialized by adapting a set of coefficients at least partially determined by processing a portion of an equalized signal corresponding to the synchronization portion of the burst $S_m$.

Preferably, n=m+1 and the equalized signal corresponding to the burst $S_n$ is equalized according to the set of coefficients produced by processing the portion of the equalized signal corresponding to the synchronization portion of the burst $S_n$.

Alternatively and preferably, the plurality of bursts $S_i$ includes a burst $S_q$, q being an integer and q>n, and an equalized signal corresponding to the burst $S_q$ is equalized according to the set of coefficients produced by processing the portion of the equalized signal corresponding to the synchronization portion of the burst $S_n$.

According to a preferred embodiment of the present invention, there is provided an equalized signal corresponding to the burst $S_n$ is an $S_n$-corresponding equalized signal, and the base station transceiver further comprises: (v) an automatic carrier frequency control for rotating a phase of the $S_n$-corresponding equalized signal according to a phase offset of the $S_n$-corresponding equalized signal to produce a rotated signal, the phase offset being determined according to a carrier frequency offset of the $S_n$-corresponding equalized signal, the automatic carrier frequency control featuring: a loop filter for adapting the carrier frequency offset of the $S_n$-corresponding equalized signal from a carrier frequency offset determined at least partially from an equalized signal corresponding to the burst $S_m$.

Preferably, an initial carrier phase is assumed at a start of processing the portion of each equalized signal corresponding to the synchronization portion of each burst $S_i$, the automatic carrier frequency control further featuring: (2) a phase initializer for determining a phase error according to the synchronization portion of the $S_n$-corresponding equalized signal and for correcting the initial carrier phase according to the phase error to determine a correct phase, such that a set of equalizer coefficients being processed according to the synchronization portion corresponding to the burst $S_n$ is also processed according to the correct phase by the initialized coefficient adjustment procedure.

Preferably, each burst features a header and a traffic portion, and the header is the synchronization portion, the header being processed a first time for determining the correct phase and the header being processed a second time for processing the set of equalizer coefficients.

Also preferably, the base station transceiver further comprises: (v) at least one digital gain for correcting a gain of the second sampled digital signal.

According to other preferred embodiments of the present invention, the base station transceiver further comprises: (v) a transmitter for receiving a digital input, for converting the digital input to an analog signal and for transmitting the analog signal to the terminal station, the transmitter featuring a digital-to-analog converter for converting the digital input to produce the analog signal according to a base station transmission clock; wherein the sampling timing of the analog-to-digital converter of the base station transceiver is determined directly according to the base station transmission clock, and wherein the system further comprises: (b) a terminal station transceiver, the terminal station transceiver featuring: (i) a receiver unit for receiving the analog signal from the base station; (ii) a symbol timing recovery unit for recovering the base station transmission clock from the analog signal to form a recovered clock; (iii) an analog-to-digital processing unit for processing the analog signal to a processed digital signal according to the recovered clock; and (iv) a transmitter for receiving a digital input, for converting the digital input to an analog signal and for transmitting the analog signal to the base station, the transmitter featuring a digital-to-analog converter for converting the digital input to produce the analog signal according to the recovered clock.

Preferably, the analog-to-digital processing unit features an analog-to-digital converter for converting the analog signal to a sampled digital signal by sampling the analog signal according to a terminal station reception clock, the terminal station reception clock being determined directly according to the recovered clock.

Alternatively and preferably, the analog-to-digital processing unit features: (1) an analog-to-digital converter for converting the analog signal to a sampled digital signal by sampling the analog signal according to a terminal station reception clock, the terminal station reception clock being determined directly according to a free-running oscillator; and (2) at least one interpolating receive filter for filtering the sampled digital signal directly according to the recovered clock; and wherein the transmitter features at least one interpolating filter for filtering the digital input directly according to the recovered clock.

More preferably, the symbol timing recovery unit features: (A) a loop filter for determining a timing frequency offset of the sampled digital signal; and (B) an integrator for determining a timing phase shift according to the timing frequency offset; such that the at least one interpolating receive filter performs an interpolation of the sampled digital signal also according to the timing phase shift.

Most preferably, the at least one interpolating receive filter performs the interpolation of the sampled digital signal by precomputing a plurality of interpolations according to a plurality of possible phase shifts, and then selecting one of the plurality of interpolations for interpolating the sampled digital signal according to an actual phase shift of the sampled digital signal.

According to another embodiment of the present invention, there is provided a system for communication between a base station and at least one terminal station, the base station receiving a plurality of sequentially transmitted bursts from the at least one terminal station according to a TDMA (time division multiple access) protocol, each burst featuring a synchronization portion, each of the plurality of sequentially transmitted bursts being denoted $S_i$ wherein i is an integer, the plurality of sequentially transmitted bursts including at least a burst $S_m$ and a burst $S_n$ being sent from one terminal station, wherein m and n are each integers and m<n, the system comprising: a base station transceiver comprising: (i) a receiver unit for receiving the plurality of bursts $S_i$, including at least the burst $S_m$ and the burst $S_n$, and for producing each of a plurality of analog signals from each of the plurality of bursts $S_i$; (ii) a digital receiver front-end unit for converting each of the plurality of analog signals to each of a plurality of processed digital signals, a processed signal corresponding to the burst $S_n$ being an $S_n$-corresponding processed signal; and (iii) an automatic carrier frequency control for rotating a phase of the $S_n$-corresponding processed signal according to a phase offset of the $S_n$-corresponding processed signal to produce a rotated signal, the phase offset being determined according to a carrier frequency offset of the $S_n$-corresponding processed signal, the automatic carrier frequency control featuring: a loop filter for adapting the carrier frequency offset of the $S_n$-corresponding processed signal from a carrier frequency offset determined at least partially from a processed signal corresponding to the burst $S_m$.

Preferably, an initial carrier phase is assumed at a start of processing the portion of each equalized signal corresponding to the synchronization portion of each burst $S_i$, the automatic carrier frequency control further featuring: (2) a phase initializer for determining a phase error according to the synchronization portion of the $S_n$-corresponding equalized signal and for correcting the initial carrier phase according to the phase error to determine a correct phase, such that a set of equalizer coefficients being processed according to the synchronization portion corresponding to the burst $S_n$ is also processed according to the correct phase by the initialized coefficient adjustment procedure.

According to yet another embodiment of the present invention, there is provided a method for communication between a base station and at least one terminal station, the base station receiving a plurality of sequentially transmitted bursts from the at least one terminal station according to a TDMA (time division multiple access) protocol, each burst featuring a synchronization portion, each of the plurality of sequentially transmitted bursts being denoted $S_i$ wherein i is an integer, the plurality of sequentially transmitted bursts including at least a burst $S_m$ and a burst $S_n$ being sent from one terminal station, wherein m and n are each integers and m<n, the base station featuring a base station transceiver, the steps of the method being performed by the base station transceiver, the method comprising the steps of: (a) receiving the plurality of bursts $S_i$, including at least the burst $S_m$ and the burst $S_n$; (b) producing each of a plurality of analog signals from each of the plurality of bursts $S_i$; (c) converting each analog signal to a sampled digital signal, by sampling each analog signal according to a sampling timing; and (d) processing each sampled digital signal according to at least one parameter to form a digital output, the at least one parameter being an adapted parameter, such that for processing a sampled digital signal corresponding to burst $S_n$, the adapted parameter is adapted according to another parameter at least partially determined by processing a sampled digital signal corresponding to the burst $S_m$.

Preferably, the at least one parameter is a set of equalizer coefficients, and the step of processing the sampled digital signal includes the steps of: (i) equalizing the sampled digital signal according to the set of equalizer coefficients; and (ii) determining each set of coefficients by processing a portion of an equalized signal corresponding to the synchronization portion of a burst $S_i$ according to an initialized coefficient adjustment procedure, such that for processing a portion of an equalized signal corresponding to the synchronization portion of the burst $S_n$, the initialized coefficient adjustment procedure is initialized by adapting a set of coefficients at least partially determined by processing a portion of an equalized signal corresponding to the synchronization portion of the burst $S_m$.

More preferably, n=m+1 and the equalized signal corresponding to the burst $S_n$ is equalized according to the set of coefficients produced by processing the portion of the equalized signal corresponding to the synchronization portion of the burst $S_n$.

Alternatively and more preferably, the plurality of bursts $S_i$ includes a burst $S_q$, q being an integer and q>n, and an equalized signal corresponding to the burst $S_q$ is equalized according to the set of coefficients produced by processing the portion of the equalized signal corresponding to the synchronization portion of the burst $S_n$.

According to still other preferred embodiments of the present invention, an equalized signal corresponding to the burst $S_n$ is an $S_n$-corresponding equalized signal, and the step of processing the sampled digital signal further comprises the steps of: (iii) determining a carrier frequency offset of the $S_n$-corresponding equalized signal by adapting the carrier frequency offset of the $S_n$-corresponding equalized signal from a carrier frequency offset determined at least partially from an equalized signal corresponding to the burst $S_m$; (iv) determining a carrier phase offset according to the carrier frequency offset of the $S_n$-corresponding equalized signal; and (v) rotating a phase of the $S_n$-corresponding equalized signal according to the carrier phase offset of the $S_n$-corresponding equalized signal to produce a rotated signal.

According to still another embodiment of the present invention, there is provided a method for communication between a base station and at least one terminal station, the base station receiving a plurality of sequentially transmitted bursts from the at least one terminal station according to a TDMA (time division multiple access) protocol, each burst featuring a synchronization portion, each of the plurality of sequentially transmitted bursts being denoted $S_i$ wherein i is an integer, the plurality of sequentially transmitted bursts including at least a burst $S_m$ and a burst $S_n$ being sent from one terminal station, wherein m and n are each integers and m<n, the base station featuring a base station transceiver, the base station transceiver featuring a receiver unit, an analog-to-digital converter, an adaptive equalizer and an equalizer controller, the method comprising the steps of: (a) receiving the plurality of bursts $S_i$ by the receiver unit, including at least the burst $S_m$ and the burst $S_n$; (b) producing each of a plurality of analog signals from each of the plurality of bursts $S_i$; (c) converting each analog signal to a sampled digital signal by the analog-to-digital converter, by sampling each analog signal according to a sampling timing; (d) equalizing the sampled digital signal according to the set of equalizer coefficients by the equalizer; and (e) determining each set of coefficients by the equalizer controller by processing a portion of an equalized signal corresponding to the synchronization portion of a burst $S_i$ according to an initialized coefficient adjustment procedure, such that for processing a portion of an equalized signal corresponding to the synchronization portion of the burst $S_n$, the initialized coefficient adjustment procedure is initialized by adapting a set of coefficients at least partially determined by processing a portion of an equalized signal corresponding to the synchronization portion of the burst $S_m$.

According to yet other preferred embodiments of the present invention, the base station transceiver features an automatic carrier frequency control and an equalized signal corresponding to the burst $S_n$ is an $S_n$-corresponding equalized signal, the method further comprising the steps of: (f) determining a carrier frequency offset of the $S_n$-corresponding equalized signal by the automatic carrier frequency control by adapting the carrier frequency offset of the $S_n$-corresponding equalized signal from a carrier frequency offset determined at least partially from an equalized signal corresponding to the burst $S_m$; (g) determining a carrier phase offset according to the carrier frequency offset of the $S_n$-corresponding equalized signal; and (h) rotating a phase of the $S_n$-corresponding equalized signal according to the carrier phase offset of the $S_n$-corresponding equalized signal to produce a rotated signal.

Preferably, each burst features a header and a traffic portion, and the header is the synchronization portion, the method further comprising the steps of: (i) assuming an initial carrier phase at a start of processing a portion of each equalized signal corresponding to the header of a burst $S_i$; (j) determining a phase error according to the portion of the equalized signal corresponding to the header of a burst $S_i$; (k) correcting the initial carrier phase according to the phase error to form a correct phase; and (l) adapting each set of equalizer coefficients according to the correct phase, such that a set of equalizer coefficients employed to equalize a digital sampled signal corresponding to the burst $S_n$ is also processed according to the correct phase by the initialized coefficient adjustment procedure.

More preferably, the base station transceiver additionally features a transmitter and the terminal station features a terminal station transceiver, the method further comprising the steps of: (m) receiving a digital input by the transmitter of the base station transceiver; (n) converting the digital input to an analog signal according to a base station transmission clock, such that the sampling timing of the base station transceiver for performing the step of converting each analog signal to a sampled digital signal is determined directly according to the base station transmission clock; (o) transmitting the analog signal to the terminal station; (p) receiving the analog signal from the base station by the terminal station transceiver; (q) recovering the base station transmission clock from the analog signal to form a recovered clock; (r) processing the analog signal to a processed digital signal according to the recovered clock, the processed digital signal being output from the terminal station transceiver; (s) receiving a digital input into the terminal station transceiver; (t) converting the digital input to an analog signal according to the recovered clock, such that the sampling timing of the base station transceiver has a substantially identical frequency as the recovered clock; and (u) transmitting the analog signal to the base station.

Most preferably, the step of processing the analog signal to the processed digital signal by the terminal station transceiver further comprises the step of: (i) converting the analog signal to a sampled digital signal by sampling the analog signal according to a terminal station reception clock, the terminal station reception clock being determined directly according to the recovered clock.

Alternatively and most preferably, the step of processing the analog signal to the processed digital signal by the terminal station transceiver further comprises the steps of: (i) converting the analog signal to a sampled digital signal by sampling the analog signal according to a terminal station reception clock, the terminal station reception clock being determined directly according to a free-running oscillator; and (ii) interpolating the sampled digital signal directly according to the recovered clock; and wherein the step of converting the digital input to an analog signal is performed by interpolating the digital input according to the recovered clock. Preferably, the step of interpolating the sampled digital signal further comprises the steps of: (1) determining a symbol timing frequency offset of the sampled digital signal; (2) determining a symbol timing phase shift according to the symbol timing frequency offset; and (3) performing an interpolation of the sampled digital signal also according to the symbol timing phase shift; and wherein the step of interpolating the digital input further comprises the step of adjusting a phase of the digital input according to the symbol timing phase shift.

Preferably, the step of performing the interpolation of the sampled digital signal further comprises the steps of: (A) precomputing a plurality of interpolations according to a plurality of possible symbol timing phase shifts; and (B) selecting one of the plurality of interpolations for interpolating the sampled digital signal according to an actual symbol timing phase shift of the sampled digital signal.

More preferably, the step of adjusting a phase of the digital input according to the phase shift further comprises the steps of: (1) precomputing a plurality of interpolations according to a plurality of possible symbol timing phase shifts; and (2) selecting one of the plurality of interpolations for interpolating the digital input according to an actual symbol timing phase shift of the digital input.

Hereinafter, a signal which corresponds to a particular burst $S_i$ (i being an integer) is defined as having been produced by processing at least a portion of burst $S_i$, for example by sampling an analog signal obtained from the received burst $S_i$ to produce a "corresponding" digital sampled signal.

BRIEF DESCRIPTION OF THE DRAWINGS

The invention is herein described, by way of example only, with reference to the accompanying drawings, wherein:

FIG. 3A shows a schematic block diagram of an exemplary equalizer according to the present invention, while

DESCRIPTION OF THE PREFERRED EMBODIMENTS

The present invention is of a method for precise and rapid synchronization of a communication system which includes a base, or master, station and a plurality of terminal, or slave, stations. The method of the present invention uses previously obtained values for the equalizer coefficients and for the frequency offset in order to more rapidly process the signal, by starting the process of estimation with values which are taken from known values rather than arbitrarily chosen values.

The principles and operation of a method according to the present invention may be better understood with reference to the drawings and the accompanying description.

Figure 1:
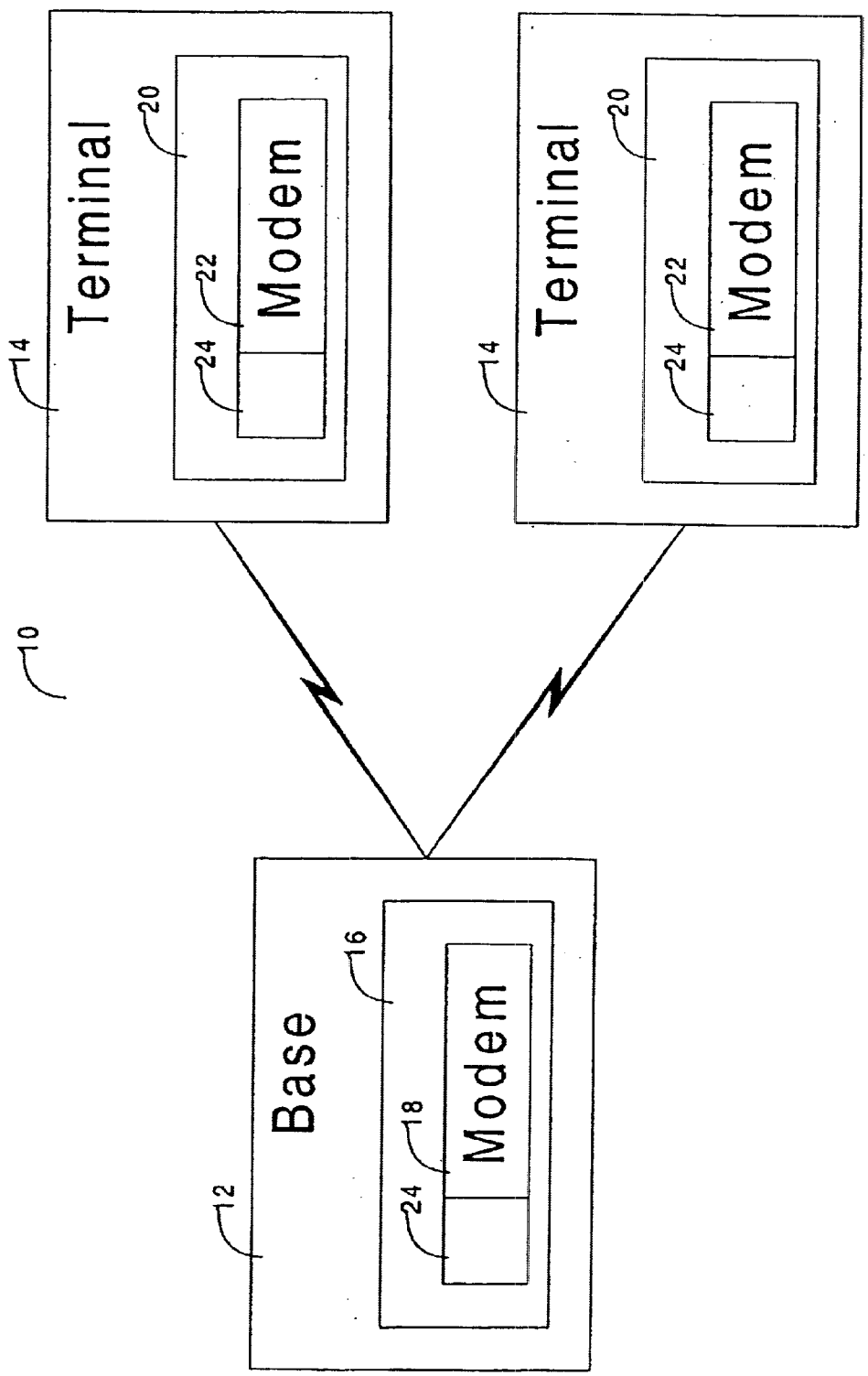
FIG. 1 shows a schematic block diagram of an exemplary system of base and terminal stations according to the background art.

Referring now to the drawings, FIG. 1 shows an exemplary system for communication according to the background art. A system 10 features a base station 12 which controls the transmissions of a plurality of terminal stations 14. Base station 12 features a base station transceiver 16, which includes a base station modem 18, as shown in greater detail with reference to FIG. 2. Terminal stations 14 each feature a terminal station transceiver 20, which includes a terminal station modem 22. Radio-frequency signals are exchanged between base station 12 and terminal stations 14, according to timing which is set by base station 12, although of course other types of signals could be substituted.

However, for the purposes of clarity only, the following discussion centers upon radio-frequency signals without intending to be limiting in any way.

Transmission from base station 12 to terminal stations 14 for the downstream transmissions is performed at one carrier frequency, and transmissions from terminal station 14 to base station 12, or upstream transmissions, are performed at another frequency, such that the downstream and upstream transmissions do not interfere with each other. For transmission of a signal from base station 12 to terminal stations 14, or downstream transmissions, communication is performed according to a TDM (time division multiplexing) protocol. For upstream transmissions from terminal stations 14 to base station 12, communication follows the TDMA (time division multiple access) protocol. Base station 12 determines the timing of transmissions by terminal stations 14.

The signal originates as a digital signal which is processed by base station modem 18 to yield an analog radio-frequency signal before transmission (conversely, each terminal station 14 can only transmit to base station 12 at a particular time, although similar processing must be performed before the digital signal can be converted and sent as an analog radio-frequency signal). As described in greater detail below, this processing includes encoding, digital to analog conversion, modulation and then upconversion to the frequency of the transmitted signal.

Terminal station transceiver 20 of each terminal station 14 features a radio-frequency receiver unit 24, which receives this analog signal, and then downconverts and demodulates the signal (radio-frequency receiver unit 24 is also a feature of base station transceiver 16). This demodulated signal is then processed by terminal station modem 22 to obtain a digital signal output. The steps of processing the demodulated signal attempt to obtain a digital signal output which is as similar as possible to the original digital signal input at base station 12. Again, as described in greater detail below, this processing includes downconversion, demodulation, analog to digital conversion, further processing and then decoding. The further processing is necessary because the analog signal which is received by terminal station transceiver 20 of terminal station 14 is not identical to the analog signal which was transmitted by base station transceiver 16. Alterations occur to the analog signal as a result of interference, radiofrequency carrier offsets and channel response.

Transmissions from terminal station transceiver 20 to base station transceiver 16 must also undergo similar processing. However, the processing of these transmissions has an added complication. Since transmissions from terminal station 14 to base station 12 are performed according to the TDMA protocol, as previously described, base station 12 must first select those parameters for receiving from a particular terminal station 14 which have changed slowly, and must then adapt these parameters for the new transmission from that terminal station 14, as described in further detail below.

Figure 2:
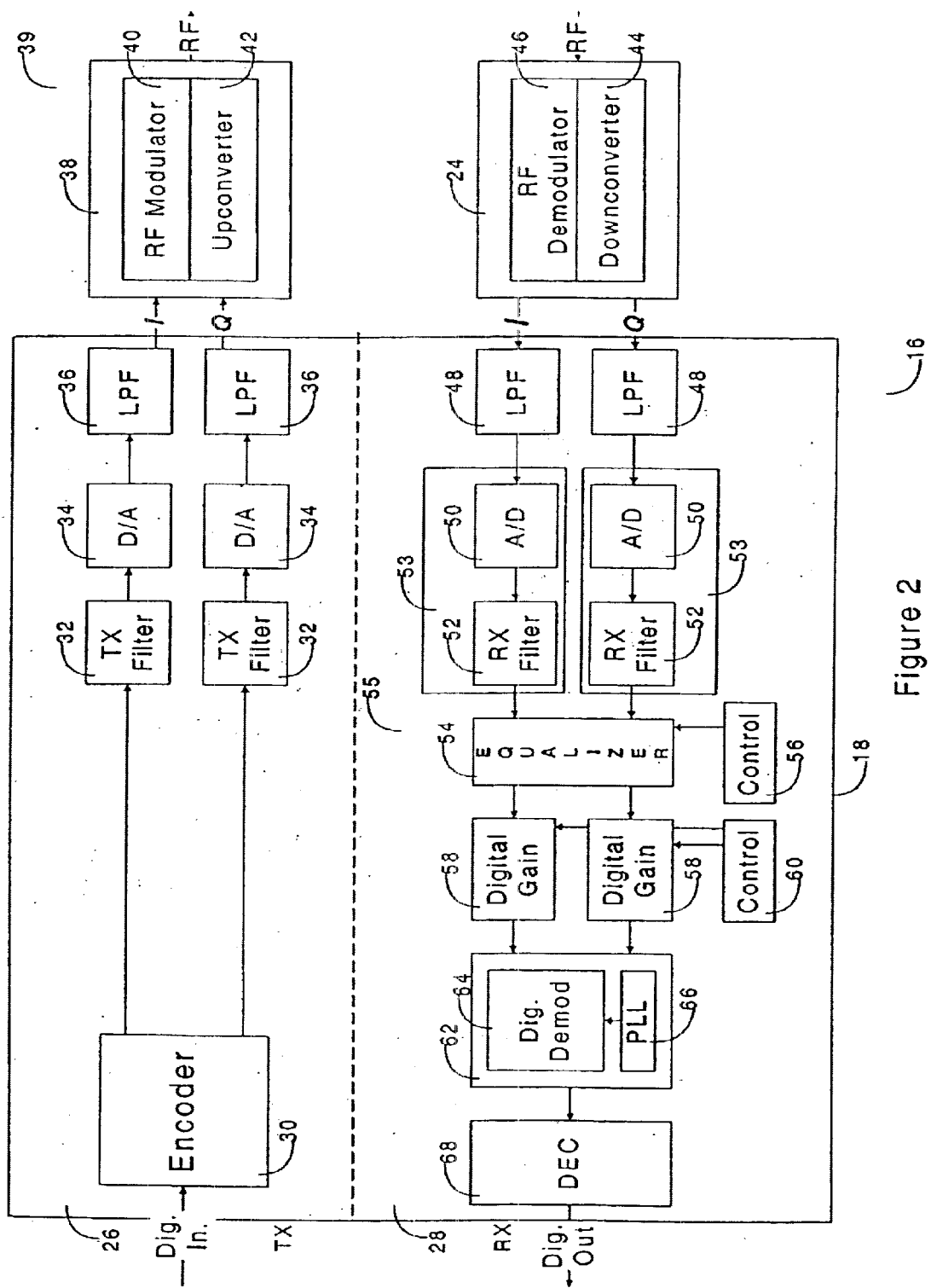
FIG. 2 shows a schematic block diagram of an exemplary transceiver, according to the present invention.

As shown with reference to FIG. 2, a number of different components are required for processing the received analog signal. These components will be described with reference to FIG. 2 and base station transceiver 16 for the sake of clarity, it being understood that components with identical reference numbers have substantially identical functions for terminal station 14, except where otherwise indicated.

Base station modem 18 has two portions: a transmit portion 26 and a receive portion 28. A transmit portion 26 starts with a digital input which is received by an encoder 30. Encoder 30 maps the digital bitstream input into symbols. A "symbol" is a k-bit sized chunk into which the transmission signal is divided. In addition, preferably encoder 30 adds redundant bits to the digital input in order to permit error correction of the signal. The digital signal is then split into two signal components designated as "I" (in phase) and "Q" (quadrature). Each digital signal component is preferably filtered by one of two digital transmit filters 32. Digital transmit filters 32 shape the power spectrum of the digital signal to reduce interference in the frequency domain between adjacent carrier frequencies used by different systems. Next, the shaped digital signal is converted to an analog signal by one of two digital-to-analog converters 34. The analog signal is then filtered by one of two analog low pass filters 36, designated as "LPF". Analog low pass filters 36 are anti-aliasing filters which reduce images from the signal. Alternatively, the process of shaping could be performed by only analog low pass filters 36.

The two components of the shaped analog signal are passed to a radio-frequency transmitter unit 38. It should be noted that transmit portion 26 and radio-frequency transmitter unit 38 could be collectively designated a transmitter 39. Radio-frequency transmitter unit 38 includes a modulator 40 and a radio-frequency upconverter 42. Modulator 40 combines the "I" and "Q" components together and modulates these components on a chosen carrier, such that the signal is now an intermediate frequency signal. Radio-frequency upconverter 42 is required to convert the intermediate frequency signal to the frequency of the transmitted radio-frequency signal, which is typically a higher value than the frequency of the intermediate frequency signal.

Turning now to receive portion 28, the analog radio-frequency signal is received by radio-frequency receiver unit 24. Radio-frequency receiver unit 24 includes a radio-frequency downconverter 44 and a demodulator 46. Radio-frequency downconverter 44 is required to convert the frequency of the transmitted radio-frequency signal to an intermediate frequency signal. Next, the intermediate frequency signal passes to demodulator 46, which splits the signal into the two components of "I" and "Q".

These two signal components are processed separately by one of two analog low pass filters 48, designated as "LPF". Next, the low pass filtered signals for "I" and "Q" are converted from analog signals to digital signals by one of two analog-to-digital converters 50. Digital-to-analog converters 34 and analog-to-digital converters 50 must both be precisely timed, in order for samples to be taken at the correct times. The timing is either set from outside base station modem 18, for example through recovery of an external clock which could be supplied from a public telephone exchange, or else is determined internally, such as from an internal oscillator.

The digital signals are then preferably passed to one of two digital receive filters 52. Preferably, digital receive filters 52 filter noise to improve the signal to noise ratio and are matched for a channel with no phase distortion nor amplitude distortion. It should be noted that analog-to-digital converter 50and digital receive filter 52 are also collectively designated an "analog-to-digital processing unit 53".

In any case, the digital signal is then passed to an equalizer 54, which is controlled by an equalizer controller 56. Equalizer 54 is an adaptive equalizer, since the time dispersion of the symbols varies. Optionally and preferably, equalizer 54 is a fractionally spaced equalizer, and more preferably is a linear equalizer. Equalizer 54 could also optionally be a decision feedback equalizer (DFE). Optionally and more preferably, the processing which is performed by analog-to-digital processing unit 53 and equalizer 54, if present, can be described as being performed by a "digital receiver front-end unit 55".

Equalizer 54 processes the digital signal in order to compensate for ISI (intersymbol interference), which occurs when two or more symbols of the transmission signal interfere with each other, as well as to compensate for phase and amplitude distortion (see for example S. Qureshi, "Adaptive Equalization", *Proceedings of the IEEE*, 73:1349–1387, 1985). Equalizer 54 must receive a training sequence of known values from the transmitting modem. For example, for base station modem 18, the transmitting modem is a terminal station modem 22. Equalizer controller 56 uses the received training sequence to update the coefficients of equalizer 54.

These adjustments are made recursively, by using an algorithm such as LMS (least mean squares) to attempt to converge the equalizer coefficients to the optimal values. Background art equalizer controllers start the process for each burst separately, without reference to any previous burst, such that the process of convergence requires an excessively large amount of time and a longer training sequence.

By contrast, equalizer controller 56 of the present invention stores the values for the equalizer coefficients and then reuses these values as an initial estimate when a new signal is received. In particular, for fixed applications in which neither base station 12 nor terminal station 14 is moving with respect to each other, the equalizer coefficients are not expected to change rapidly. Furthermore, for base station modem 18 an additional efficiency is realized, since the equalizer coefficients are expected to differ between transmissions from different terminal station modems 22, such that the equalizer coefficients can be stored for each terminal station 14 separately, and then reused when that terminal station 14 is transmitting again. Thus, reusing these values enables equalizer 54 to begin processing at a point which is much closer to convergence than simply starting at any arbitrary value.

More preferably, the equalized digital signal is split into "I" and "Q" components, which are then passed to one of two digital gains 58, each of which is controlled by a gain controller 60. As described in further detail below, digital gains 58 have the advantage of being able to rapidly adjust the gain of the digital signal in order to overcome rapid fading, for example.

The digital signal is then passed to an automatic carrier frequency control 62, designated as "AFC", which features a digital demodulator 64 and a PLL (phase locked loop) 66. The phase of digital demodulator 64 is determined by PLL 66. Automatic carrier frequency control 62 compensates for both carrier frequency offset and phase offset. Again, according to the background art, phase locked loops do not reuse previous values at the beginning of a burst, such that the process of convergence cannot take advantage of slowly changing values to converge on the optimum value more quickly. By contrast, as shown below in more detail with reference to FIGS. 5A and 5B, PLL 66 at base station modem 18 does store and reuse the values for carrier frequency offset, such that the process of convergence at the beginning of a burst is able to occur much more quickly.

From digital demodulator 64, the digital signal passes to a final digital decoder 68, designated as "DEC", which converts the digital signal to a digital bitstream output. This digital bitstream output is then sent out of receive portion 28, and the processing of the signal by base station modem 18 is complete.

Terminal station modem 22 is highly similar to base station modem 18 and is not separately shown. However, it should be noted that the function of the equalizer controller for terminal station modem 22 differs significantly from the function of the equalizer controller for base station modem 18. Since terminal station modem 22 is continuously receiving transmission signals from base station transceiver 16, the coefficients for equalizer 54 at terminal station modem 22 do not need to be reinitialized for every burst. By contrast, the coefficients for equalizer 54 of base station modem 18 do need to be reinitialized for every burst from a particular terminal station transceiver 20, preferably according to the method of the present invention as described below with regard to FIG. 3A.

Figure 3A:
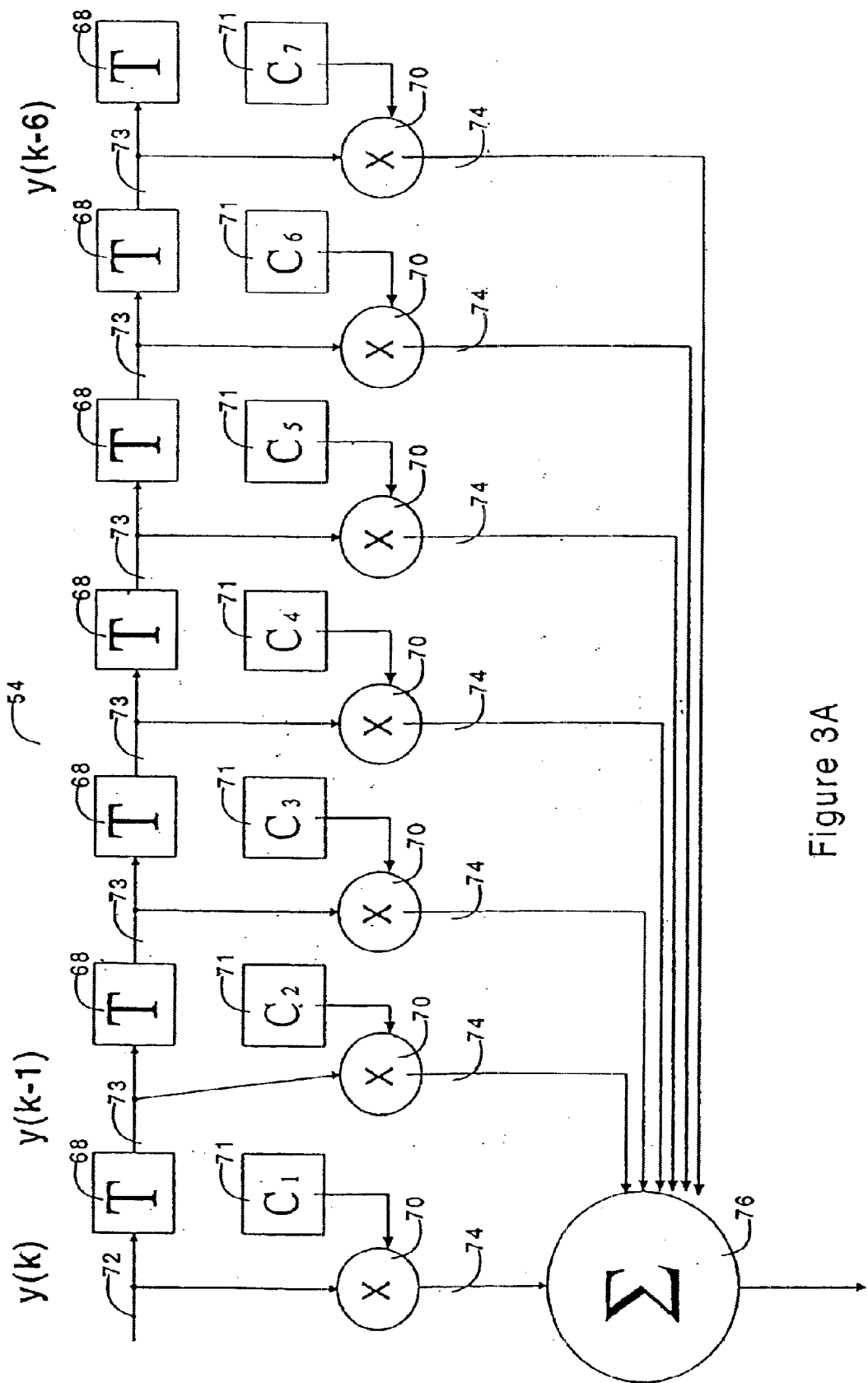

FIG. 3A shows the structure of a preferred feedforward equalizer 54. Equalizer 54 could also optionally be a decision feedback equalizer (DFE). Equalizer 54 features a plurality of delay elements 68 and a plurality of coefficients 70. Each arrow represents a complex number, although for the sake of simplicity, single lines are used to represent both components of such a number. An input signal 72 is fed to delay elements 68. Input signal 72 and delayed values 73 of input signal 72 are then multiplied by multipliers 70 by complex valued equalizer coefficients 71, illustrated as coefficients 71 C1 through C8. The number of equalizer coefficients 71 could clearly be larger or smaller than the seven coefficients 71 shown for the purposes of illustration only, without intending to be limiting in any way. Outputs 74 of multipliers 70 are then fed to a summer 76.

Figure 3B:
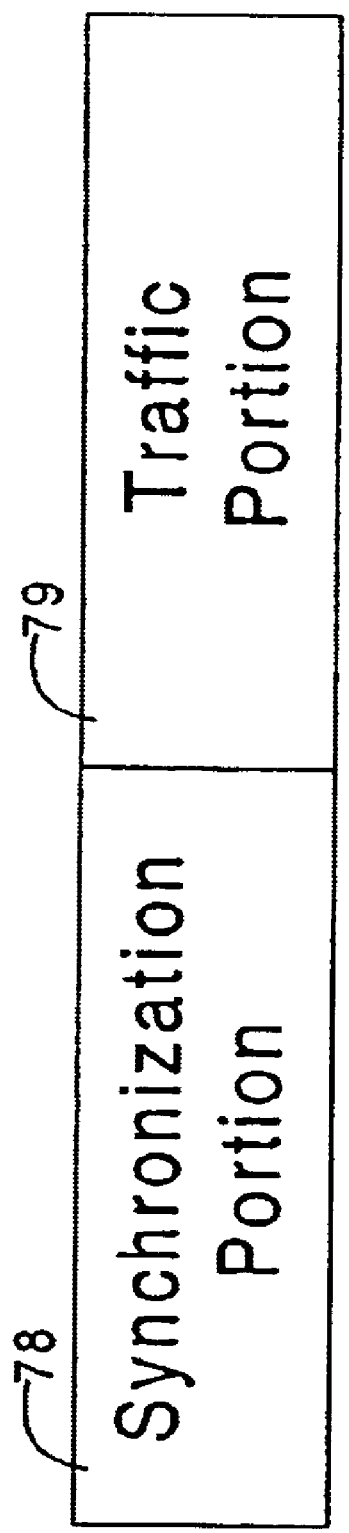
FIG. 3B is an illustration of an exemplary upstream burst structure according to the present invention.

With regard to FIG. 3B, every burst includes a synchronization portion 78 and a traffic portion 79. The purpose of synchronization portion 78 is to enable rapid and efficient synchronization of the base station receiver to be able to properly process traffic portion 79 of the burst. Synchronization portion 78 preferably appears at the beginning of the burst, in which case synchronization portion 78 is the "header" of the burst.

Synchronization portion 78 is optionally divided into two subportions, in which a first subportion is used for estimating the carrier phase for initializing PLL 66 and a second subportion is used for updating equalizer coefficients 71. Alternatively, synchronization portion 78 may have only a single field which is used for both carrier phase estimation and updating of the equalizer coefficients. The advantage of the latter approach is that shorter synchronization portions 78 can be used to maximize the available bandwidth for traffic. Without intending to be limiting in any way, for the purposes of discussion only the following description will center upon a preferred embodiment of the present invention in which synchronization portion 78 has a single field and is the header of the burst.

Equalizer 54 and equalizer controller 56 for base station modem 18 perform the method of the present invention as follows. The underlying principle of the method of the present invention is that for certain applications, especially for a fixed system of terminal stations and a base station, certain channel characteristics change more slowly than others, in particular the channel response. Equalizer coefficients 71 therefore only need to be adapted once every burst. Furthermore, values from a previous burst are used as the basis for the adaptation, which saves processing time and enables training to occur more effectively with a shorter header length.

Equalizer coefficients 71 of equalizer 54 are calculated according to any suitable adaptive algorithm known to one of ordinary skill in the art, such as the LMS (least mean squares) algorithm, although other algorithms could also be chosen. A particular suitable algorithm could be implemented by one of ordinary skill in the art. However, for ease of description, the ensuing discussion will center upon the calculation of equalizer coefficients with the LMS, it being understood that this is for the purposes of description only and is not meant to be limiting in any way.

With regard to equalizer 54 of base station modem 18, coefficients 71 are updated by using the chosen adaptation algorithm, such as LMS, preferably every symbol of the synchronization portion of the burst (see for example chapter 6 of *Adaptive Signal Processing*, by. B. Widrow and S. D. Stearns, Prentice-Hall, Inc., Englewood Cliffs, N.J., USA, 1985). Formulae for the exemplary LMS algorithm for equalizer adaptation are shown below.

The following notation is employed for these formulae. Bold font indicates column vectors, while elements of a vector are in regular font with a subscript.

Z—Digital demodulator output for header (column vector)
a—training symbols (column vector)
Y—equalizer inputs stored in the tapped delay line (column vector)
W—equalizer coefficients (column vector)
$\mu$—step size
$\psi$—average phase error of beginning of header after digital demodulator
$\phi$—vector of phases of digital demodulator
r—rotated training sequence
p—output of equalizer
e—equalizer error
j—square root of $-1$
i—subscript denoting time in symbols The steps of the method for every burst are as follows. First, before the synchronization portion of the burst is processed, coefficients 71 of equalizer 54 are initialized to previously stored values from equalizer controller 56, which includes some type of writable memory for storing these values, according to an initialized coefficient adjustment procedure. Second, the carrier frequency offset of PLL 66 is initialized to the previously stored value, as shown with reference to FIGS. 5A and 5B.

Next, the header of the burst is processed by digital demodulator 64 to produce an output denoted by Z.

The carrier phase error for the header is then estimated according to the following equation:

$$\psi = angle\left\{\sum_{i=1}^{L} a_i^* Z_i\right\} \quad \text{(equation 1)}$$

wherein L is the length of the header and wherein $a_i^*$ is the complex conjugate of $a_i$.

Next, the phase vector $\phi$, which is the vector of phases used by digital demodulator 64 during processing of the phase portion of the header, is corrected for the carrier phase error as follows:

$$\phi_i = \phi_i + \psi, \text{ for } 1 \leq i \leq L \quad \text{(equation 2)}$$

The value of the phase stored in the phase register of PLL 66 (shown in FIGS. 5A and 5B below) is corrected by adding $\psi$ to the current value.

Then, a is rotated with $\phi$ according to the following equation:

$$r_i = a_i^* \exp(j^* \phi_i) \text{ for } 1 \leq i \leq L \quad \text{(equation 3)}$$

Next, a number of coefficient updates are performed as follows for all i, $1 < i < L$. First, a symbol is filtered by equalizer 54 or by equalizer controller 56 according to the following equation:

$$p_i = Y_i^T W_i - 1 \quad \text{(equation 4)}$$

which is the product of the transposed equalizer input vector and the equalizer coefficients vector.

Next, the error is computed according to the following equation:

$$e_i = r_i - p_i \quad \text{(equation 5)}$$

which is the difference between the expected value of the output of equalizer 54 and the equalizer output value for each symbol. The equalizer coefficients are then adjusted according to the computed error and the following equation:

$$W_i = w_{i-1} + \mu f(Y_i) e_i \quad \text{(equation 6)}$$

wherein $(Y_i)$ is the element-wise complex conjugate for all elements of Y and the step size, $\mu$, is determined as a trade-off between tracking speed and residual error, calculated according to the following factors: the average energy of the signal; the number of coefficients 71 in equalizer 54; characteristics of the channel; rate at which the channel varies; and the tolerable tracking error. The process is repeated for equations 3, 4, 5 and 6 for all i, $1 \leq i \leq L$. Updated equalizer coefficients 71 are then used by equalizer 54 to equalize the incoming signal during the steady-state processing of the traffic portion of the received burst after the header has been used for synchronization and equalizer coefficient updating.

In this method, coefficients 71 are adapted and then stored by equalizer controller 56. If a plurality of transmitted bursts are received from a particular terminal station 14, designated as $S_i$ which includes at least bursts $S_m$, $S_n$, and $S_q$, from a single terminal station, m, n, and q being integers, $m < n < q$, then coefficients 71 are preferably calculated as follows. Equalizer controller 56 determines each set of coefficients by processing a portion of an equalized signal corresponding to the synchronization portion of a burst $S_i$ according to an initialized coefficient adjustment procedure, such that for processing a portion of an equalized signal corresponding to the synchronization portion of the burst $S_n$, the initialized coefficient adjustment procedure is initialized by adapting a set of coefficients at least partially determined by processing a portion of an equalized signal corresponding to the synchronization portion of the burst $S_m$. For this preferred embodiment, the last calculated value of coefficients 71 at the end of the processing of burst $S_m$ is used as the value of $W_i$ in equations 3 and 5 above for the beginning of the burst $S_n$, which forms the initialization of the coefficient adjustment procedure.

Optionally and preferably, $n = m + 1$ and the equalized signal corresponding to the burst $S_n$ is equalized according to the set of coefficients produced by processing the portion of the equalized signal corresponding to the synchronization portion of the burst $S_n$.

Alternatively and preferably, an equalized signal corresponding to the burst $S_q$ is equalized according to the set of coefficients produced by processing the portion of the equalized signal corresponding to the synchronization portion of the burst $S_n$. This alternative is preferred since these steps for calculating the coefficients require more processing time than can easily be accommodated before the processing of the traffic portion of burst $S_n$.

In the particularly preferred embodiment shown in FIG. 2, two digital gains 58 are preferably featured. Slow changes in the channel are corrected by changing terminal station radio-frequency power, by using adjustable gains within radio-frequency transmitter unit 40. However, typically the gain can alter quickly, even in the system described above in which certain channel characteristics are changing slowly. For example, the signal could undergo both rapid fading for flat fades and slow fading for selective fades. Although slow flat fading could be compensated for by the analog gain control, digital gains 58 have the advantage of being able to rapidly and precisely adjust the gain of the digital signal in order to overcome rapid fading.

The placement of these digital gains 58 is flexible and could easily be determined by one of ordinary skill in the art. For example, digital gains 58 could be placed before equalizer 54 or after equalizer 54. As shown, digital gains 58 are preferably placed after equalizer 54 in order to reduce computational complexity.

As shown with reference to FIG. 2, and in more detail with reference to FIGS. 4A–4D, accurate symbol timing is very important for accurate processing of the received analog signal to the correct digital signal. The received analog signal needs to be sampled at time intervals which are preferably both fixed and appropriate in order to correctly determine the value for the symbol. However, sampling at fixed time intervals is more important than sampling at intervals which are appropriate to the analog signal itself, since inaccuracies introduced by the latter error are amenable to correction, preferably by equalizer 54. Without consistent timing, such that sampling occurs at fixed, known intervals, inaccuracies such as ISI (intersymbol interference) are difficult to correct.

Figure 4A:
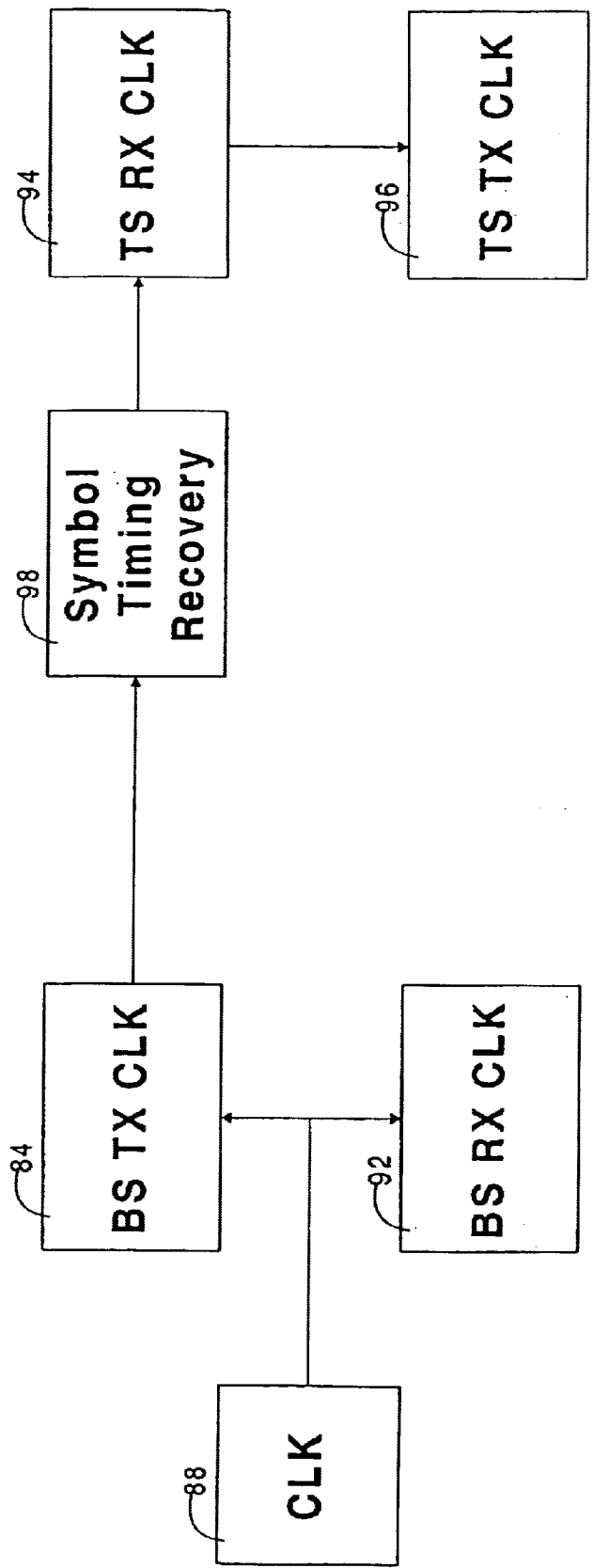
FIGS. 4A–4D illustrate various preferred embodiments of the loop timing-based symbol timing according to the present invention.
Figure 4B:
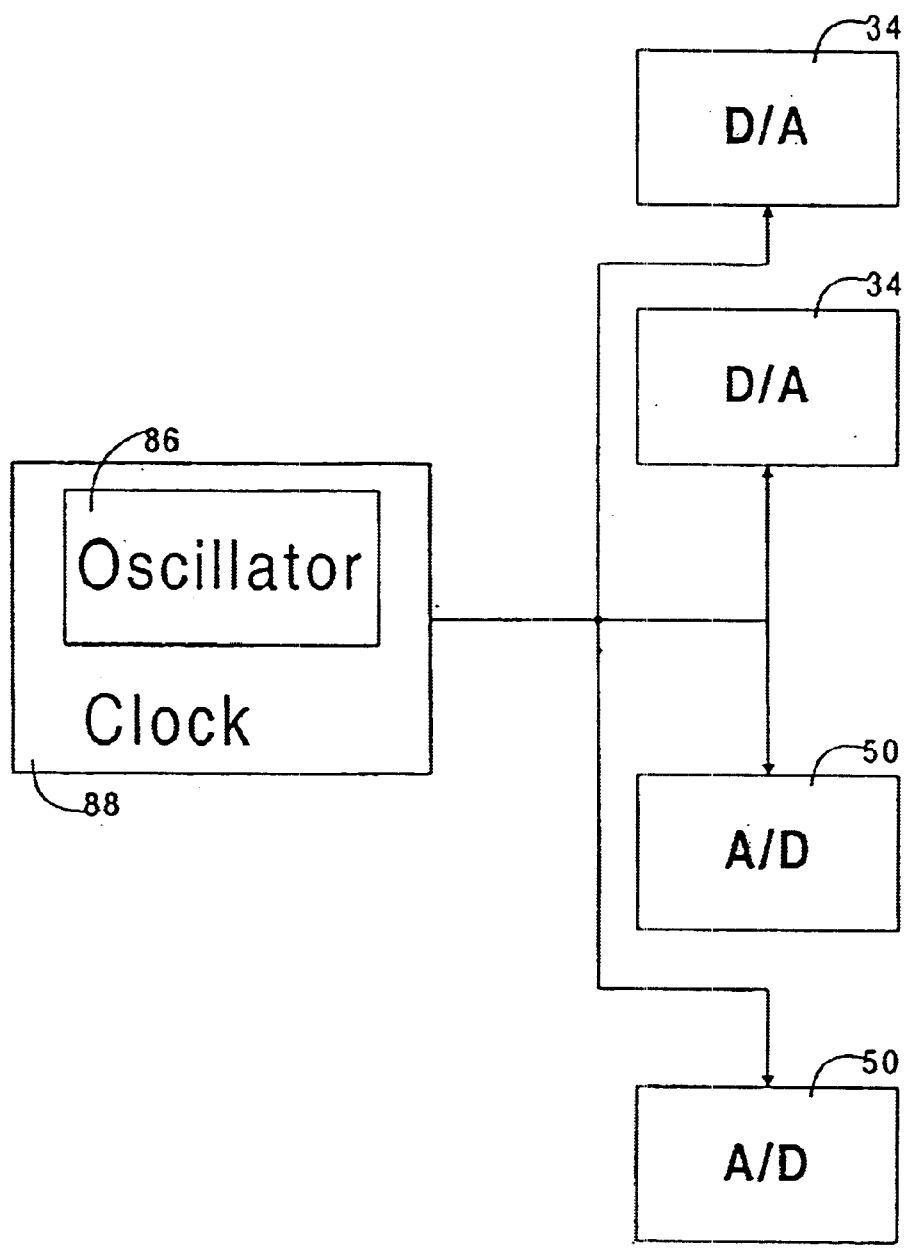
Figure 4C:
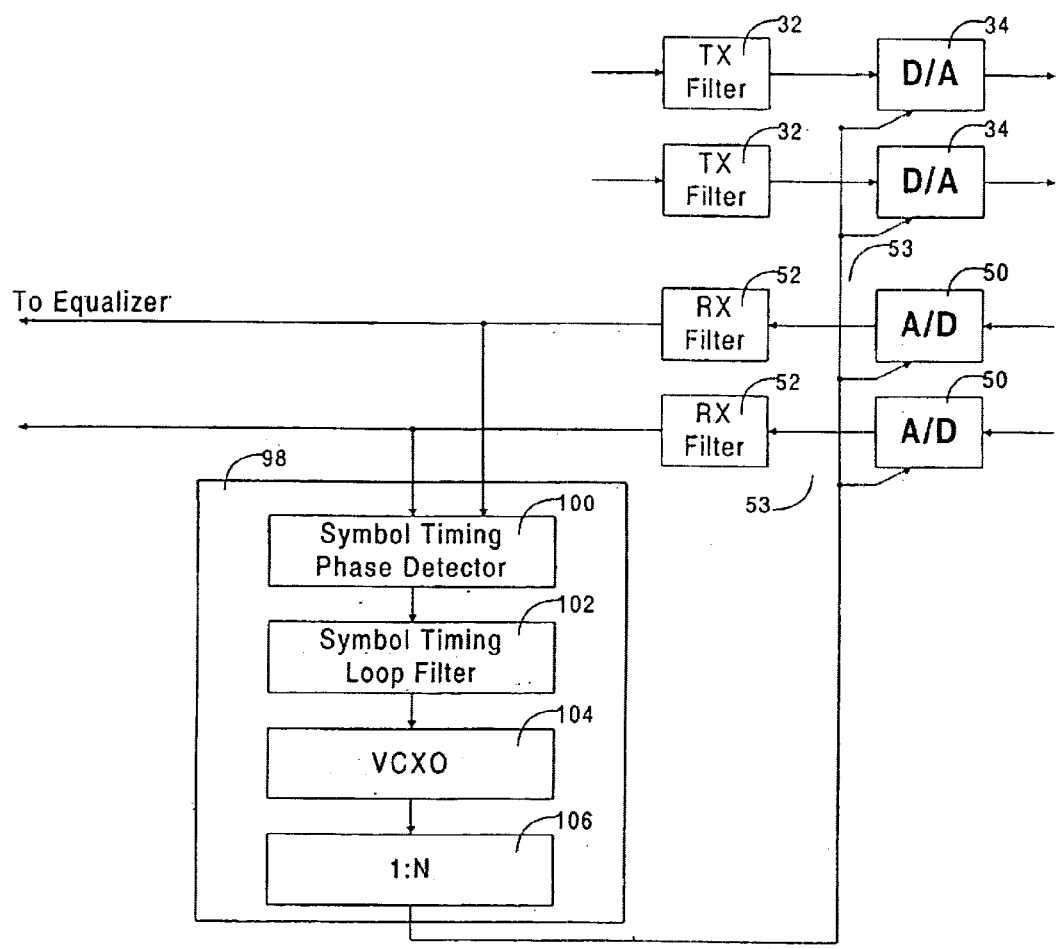
Figure 4D:
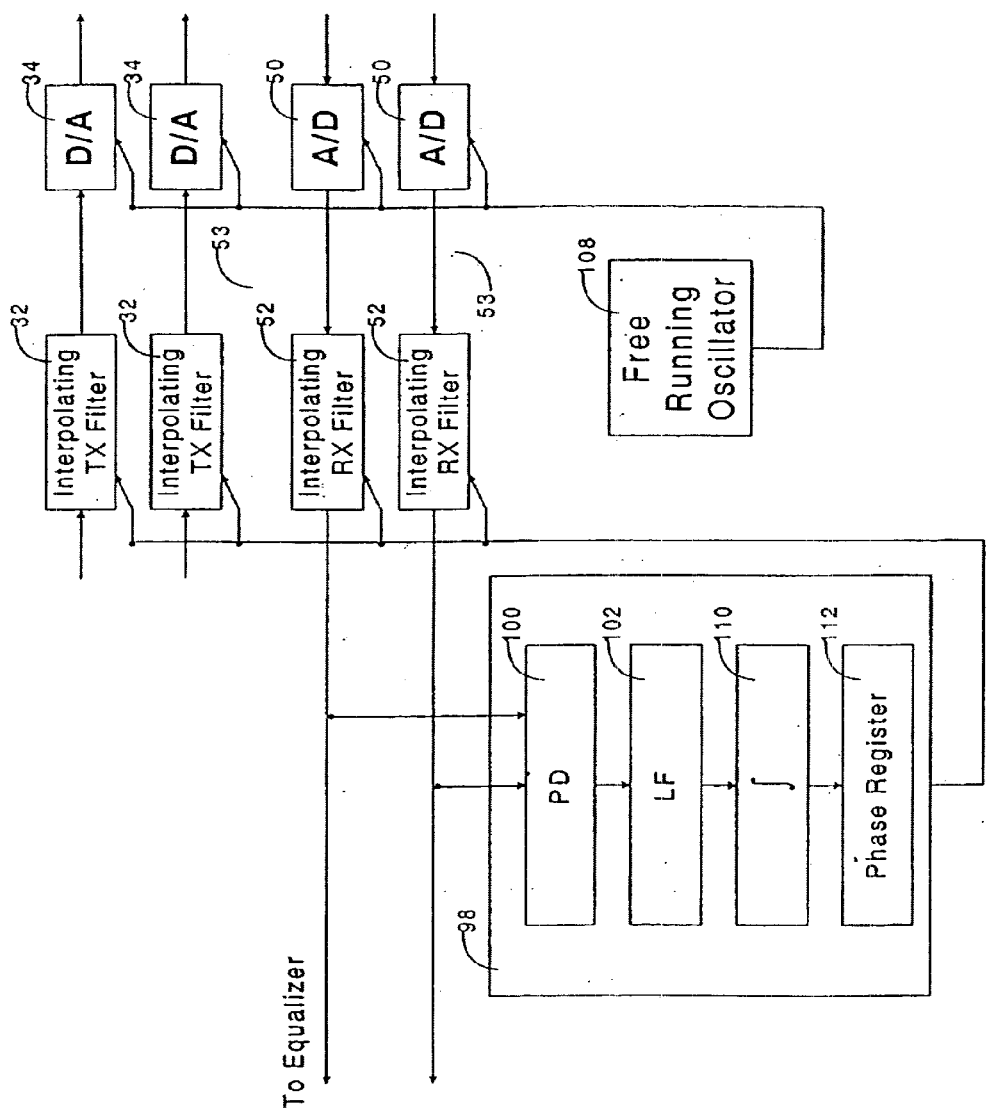

According to the preferred embodiment of the present invention illustrated in FIGS. 2 and 4–4D, timing for the entire system is set by a base station transmission clock 84, since base station 12 controls the timing of transmissions to and from terminal stations 14. Timing for base station transmission clock 84 is preferably set internally by an oscillator 86, shown as part of a clock 88. Oscillator 86 could be a free-running crystal oscillator for example. Alternatively and preferably, oscillator 86 could be a voltage controlled crystal oscillator (VCXO) with a fixed voltage at input, or a VCXO locked to an external clock.

As shown with reference to FIG. 4B, clock 88 determines the timing of digital-to-analog converter 34 and the timing of analog-to-digital converter 50, such that base station reception clock 92 is locked to base station transmission clock 84.

Base station transmission clock 84 also sets the timing for terminal station reception clock 94, since the terminal station modem can recover the clock from the received signal by a symbol timing recovery unit 98, as described in greater detail below with regard to FIGS. 4C and 4D. Since the clock is recovered from the received signal, preferably continuously, the timing of terminal station reception clock 94 is thus consistent with the recovered clock and hence is also consistent with regard to base station transmission clock 84. For this preferred embodiment, analog-to-digital processing unit 53 processes the analog signal to a processed digital signal according to the recovered clock. In one embodiment described below, analog-to-digital processing unit 53 includes analog-to-digital converter 50 with sampling timing tied directly to the recovered clock. Alternatively and preferably, analog-to-digital converter 50 is tied to a free-running oscillator, and analog-to-digital processing unit 53 also includes at least one digital receive filter 52 which is an interpolating receive filter. Digital receive filter 52 then filters the sampled digital signal according to the recovered clock.

Terminal station reception clock 94 in turn sets the timing for terminal station transmission clock 96, such that terminal station transmission clock 96 and base station reception clock 92 should be timed substantially identically. However, terminal station transmission clock 96 is not directly tied to base station reception clock 92. Instead an arbitrary fixed phase shift exists between these two clocks, although the frequency is fixed. Sampling at the base station transceiver is arbitrary, but consistent for any particular terminal station 14. Correction for the non-optimal phase at the base station can be performed by the equalizer by using the stored equalizer coefficients, such that no symbol timing recovery is required at base station 12 thereby enabling the receiver to immediately begin compensating for symbol timing phase, without waiting for timing recovery. Thus, time and effort do not need to be wasted within each burst in order to set a timing recovery loop at the base station (see for example *The Theory and Practice of Modem Design*, Chapter 7, by J. A. C. Bingham, John Wiley & Sons, 1988; and D. Godard, "Pass-Band Timing Recovery in an All-Digital Modem Receiver", *IEEE Trans. Commun.*, COM-26:517–523, 1978).

According to one preferred embodiment of the present invention, as shown in FIG. 4C, symbol timing recovery unit 98 of the terminal station includes a symbol timing phase detector 100, which receives input from digital receive filters 52. Symbol timing phase detector 100 detects the phase of the input, and feeds the phase to a symbol timing loop filter 102. Symbol timing loop filter 102 determines the timing frequency offset, which is then fed to a VCXO 104. The oscillating signal is output from VCXO 104 and is preferably fed to a divider 106. The output of divider 106 is then used as a clock signal for analog-to-digital converters 50 and digital-to-analog converters 34 together. Thus, according to this preferred embodiment, analog-to-digital converters 50 and digital-to-analog converters 34 are directly locked to the recovered clock together, such that the two clocks are directly tied together.

According to another preferred embodiment of the present invention, as shown in FIG. 4D, symbol timing recovery unit 98 does not directly lock analog-to-digital converters 50 and digital-to-analog converters 34 to the recovered clock. Instead, a free running oscillator 108 controls the timing of analog-to-digital converters 50 and digital-to-analog converters 34. Again, symbol timing recovery unit 98 features symbol timing phase detector 100 and symbol timing loop filter 102. However, now the symbol timing frequency offset is fed to an integrator 110, which determines the phase. This phase is then stored in a phase register 112.

According to this preferred embodiment, digital receive filters 52 are now interpolating receive filters, and digital transmission filters 32 are interpolating transmission filters. The interpolating filter is a tapped delay line with time-varying filter coefficients. These coefficients are either computed on the fly, or alternatively are precomputed. More preferably, if the coefficients are precomputed, a plurality of different sets of coefficients are precomputed and are selected according to the phase in phase register 112. The interpolation is performed to overcome the difference between the expected phase and the actual phase, such that the timing is adjusted according to the phase shift. Thus, digital receive filters 52 performs a process of interpolation according to the phase shift to process the analog signal to form a processed digital signal. Similarly, digital transmit filters 32 perform a process of interpolation according to the phase shift determined also for digital receive filters 52, such that the encoded digital signal filters and adjusts the phase of the signal.

Figure 5A:
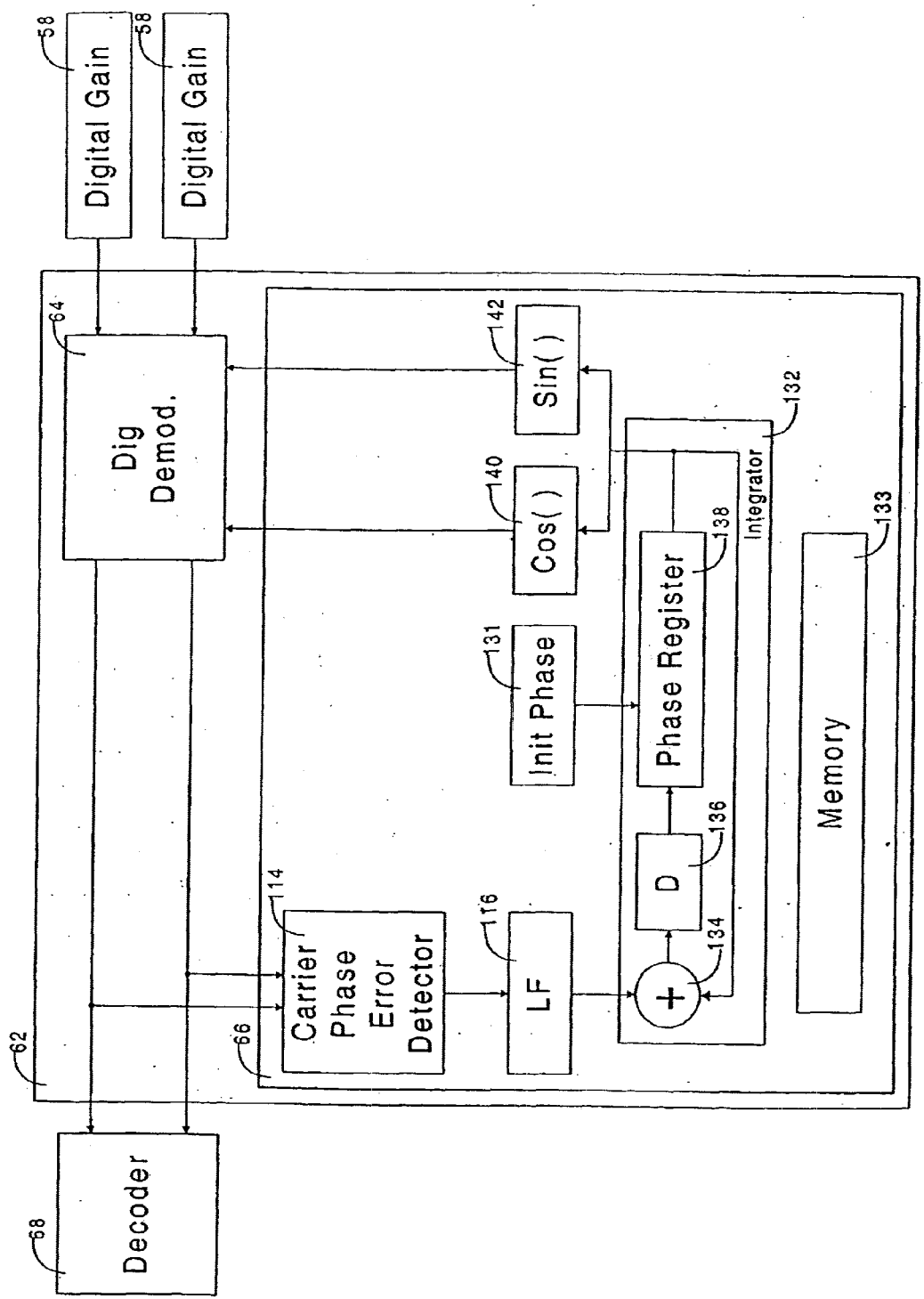
FIGS. 5A and 5B show a schematic block diagram of an exemplary automatic frequency control system (AFC) according to the present invention.
Figure 5B:
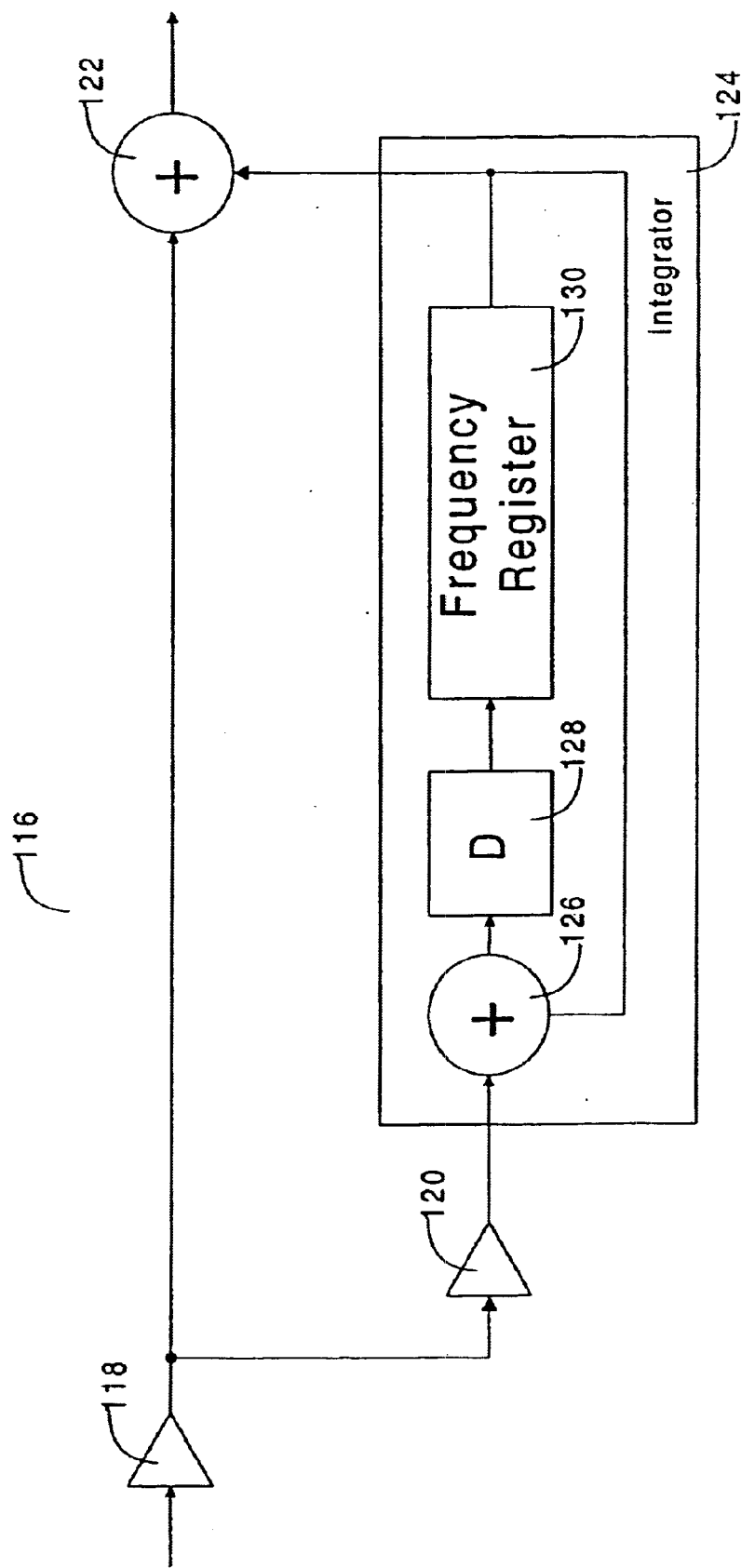

As shown in FIGS. 5A and 5B, preferably the base station modem features an automatic carrier frequency control 62, designated as "AFC", which features PLL 66 and digital demodulator 64. Automatic carrier frequency control 62 compensates for both frequency offset and phase offset. At the beginning of every burst, there is a need to converge PLL 66, for example by processing the synchronization portion of the burst, since different terminal stations have different carrier offsets. According to the background art, automatic frequency controllers generally do not reuse previous values, such that the process of convergence cannot take advantage of slowly changing values to converge on the optimum value more quickly. By contrast, as shown in more detail with reference to FIGS. 5A and 5B, automatic carrier frequency control 62 does store and reuse the values for frequency offset, such that the process of convergence is able to occur much more quickly.

Automatic carrier frequency control 62 is shown in more detail in FIG. 5A. Signal components "I" and "Q" are received from digital gains 58 and fed to digital demodulator 64. Digital demodulator 64 rotates "I" and "Q" according to the phase offset to produce I' and Q' according to the following equations:

$$I' = I \cos \phi + Q \sin \phi$$

$$Q' = Q \cos \phi - I \sin \phi$$

wherein $\phi$ is the phase offset. The corrected signal components I' and Q', which have been corrected for the phase offset, are now fed to digital decoder 68 and the process continues substantially as described for FIG. 2 above.

In addition, rotated signal components I' and Q' are also used as a starting point to determine the correct phase offset to be employed by digital demodulator 64. These rotated signal components are fed to a carrier phase error detector 114, which estimates the carrier phase error in the signal. Next, the estimated error signal is fed to a loop filter 116, which uses the estimated frequency offset saved between bursts in order to initialize loop filter 116 at the start of the burst. The frequencies by which the signal is modulated, upconverted, downconverted and demodulated will have some deviation from their ideal values. The sum of all these deviations is the carrier frequency offset.

A preferred embodiment of loop filter 116 is shown in more detail in FIG. 5B. As shown, the estimated phase error signal is given to a first gain 118. The result is fed to a second gain 120, and is also fed to an adder 122. Second gain 120 then feeds the signal to an integrator 124. Integrator 124 features an adder 126, which adds the signal with the previous value output from integrator 124. Next, the signal is fed to a delay 128 to determine the frequency. The frequency is then stored in a frequency register 130 and is then output from integrator 124. The output signal is also fed back to adder 126 within integrator 124. From integrator 124, the signal goes to adder 122. Alternative embodiments of loop filter 116 could also be selected by one of ordinary skill in the art.

For any of these embodiments, the output of adder 122, the carrier frequency offset, is fed to a second integrator 132. Second integrator 132 also features an adder 134 and a delay 136, similar to first integrator 124. Second integrator 132 calculates the phase offset, which is stored within a phase register 138 within second integrator 132. Next, after the phase offset is calculated, the phase offset is given to a cosine calculator 140 and a sine calculator 142 to determine the correct values for $\cos \phi$ and for $\sin \phi$. These values are then fed to digital demodulator 64 substantially as previously described.

Optionally and preferably, digital demodulator 64 corrects for both carrier frequency and phase offset only after the header has been processed to estimate an initial value for the phase register. Preferably, digital demodulator 64 only corrects for carrier frequency offset during the processing of the header, and then corrects for both carrier frequency and phase offset after processing of the header. Digital demodulator 64 is able to correct for the carrier frequency offset during the processing of the header, because digital demodulator 64 is able to use the carrier frequency offset calculated during the previous burst by this particular terminal station.

For example, assume that a plurality of transmitted bursts is received from terminal station 14, designated as $S_i$, which includes at least bursts $S_m$, $S_n$, and $S_q$, from a single terminal station, m, n, and q being integers, m<n<q and that an equalized signal corresponding to a particular burst $S_n$ is an $S_n$-corresponding equalized signal. Then, the carrier frequency offset of the $S_n$-corresponding equalized signal is determined by loop filter 116 by adapting this carrier frequency offset of the $S_n$-corresponding equalized signal from a carrier frequency offset determined at least partially from an equalized signal corresponding to the burst $S_m$.

More preferably, if an initial carrier phase is assumed at a start of processing the portion of each equalized signal corresponding to the synchronization portion of each burst $S_i$, then automatic carrier frequency control 62 also features a phase initializer 131. Phase initializer 131 determines a phase error according to the synchronization portion of the $S_n$-corresponding equalized signal, and then corrects the initial carrier phase according to the phase error to determine a correct phase, such that a set of equalizer coefficients being processed according to the synchronization portion corresponding to the burst $S_n$ is also processed according to the correct phase by the initialized coefficient adjustment procedure (described previously with reference to FIGS. 3A and 3B).

The carrier frequency offset changes only slightly between bursts by the same terminal station, while the carrier phase offset changes too much to be taken only from stored memory. At the beginning of the burst, the phase register is initialized by an arbitrary value, more preferably zero. At the end of the header, the offset of this arbitrary value can be estimated, and the phase register is adjusted accordingly. At the end of the processing of the header, the difference between the arbitrary phase offset and correct phase offset can be calculated. The phase register is then updated with the correct phase offset.

The overall operation of AFC 62 is as follows. During processing of the start of the header, the value of frequency register 130 is loaded from stored memory, where the calculated value of this frequency register for this particular terminal station was stored during a previous burst, and phase register 138 is set to an arbitrary value, preferably zero. Next, during processing of the header, carrier phase error detector 114 is not operative. The input to loop filter 116 is therefore zero at all times, and integrator 132 produces only fixed values. At the end of the header, the carrier phase offset is estimated and the value stored in phase register 138 is corrected accordingly. For the remainder of the burst, carrier phase error detector 114 operates. At the end of the burst, frequency register 130 stores the last calculated value of frequency register 130 until the next burst transmission from this particular terminal station.

While the invention has been described with respect to a limited number of embodiments, it will be appreciated that many variations, modifications and other applications of the invention may be made.

What is claimed is:

1. A system for communication between a base station and at least one terminal station, the base station receiving a plurality of sequentially transmitted bursts from the at least one terminal station according to a TDMA (time division multiple access) protocol, each burst featuring a synchronization portion, each of the plurality of sequentially transmitted bursts being denoted $S_i$ wherein i is an integer, the plurality of sequentially transmitted bursts including at least a burst $S_m$ and a burst $S_n$ being sent from one terminal station, wherein m and n are each integers and m<n, the system comprising:

a base station transceiver comprising:
(i) a receiver unit for receiving the plurality of bursts $S_i$, including at least the burst $S_m$ and the burst $S_n$, and for producing each of a plurality of analog signals from each of the plurality of bursts $S_i$;
(ii) an analog-to-digital converter for converting each analog signal to a sampled digital signal, by sampling each analog signal according to a sampling timing;
(iii) an adaptive equalizer for equalizing each sampled digital signal according to each of a plurality of sets of equalizer coefficients to produce an equalized signal, such that a sampled digital signal corresponding to a particular burst $S_i$ is equalized according to a particular set of equalizer coefficients; and
(iv) an equalizer controller for determining each set of coefficients by processing a portion of an equalized signal corresponding to the synchronization portion of a burst $S_i$ according to an initialized coefficient adjustment procedure;

such that for processing a portion of an equalized signal corresponding to the synchronization portion of the burst $S_n$, said initialized coefficient adjustment procedure is initialized by adapting a set of coefficients at least partially determined by processing a portion of an equalized signal corresponding to the synchronization portion of the burst $S_m$;

wherein an equalized signal corresponding to the burst $S_n$ is an $S_n$-corresponding equalized signal, and said base station transceiver further comprises:

(v) an automatic carrier frequency control for rotating a phase of said $S_n$-corresponding equalized signal according to a phase offset of said $S_n$-corresponding equalized signal to produce a rotated signal, said phase offset being determined according to a carrier frequency offset of said $S_n$-corresponding equalized signal, said automatic carrier frequency control featuring:

(A) a loop filter for adapting said carrier frequency offset of said $S_n$-corresponding equalized signal from a carrier frequency offset determined at least partially from an equalized signal corresponding to the burst $S_m$;

and wherein an initial carrier phase is assumed at a start of processing said portion of each equalized signal corresponding to the synchronization portion of each burst $S_i$, said automatic carrier frequency control further featuring:

(B) a phase initializer for determining a phase error according to said synchronization portion of said $S_n$-corresponding equalized signal and for correcting said initial carrier phase according to said phase error to determine a correct phase, such that a set of equalizer coefficients being processed according to said synchronization portion corresponding to the burst $S_n$ is also processed according to said correct phase by said initialized coefficient adjustment procedure.

2. A system for communication between a base station and at least one terminal station, the base station receiving a plurality of sequentially transmitted bursts from the at least one terminal station according to a TDMA (time division multiple access) protocol, each burst featuring a synchronization portion, each of the plurality of sequentially transmitted bursts being denoted $S_i$ wherein i is an integer, the plurality of sequentially transmitted bursts including at least a burst $S_m$ and a burst $S_n$ being sent from one terminal station, wherein m and n are each integers and m<n, the system comprising:

a base station transceiver comprising:
(i) a receiver unit for receiving the plurality of bursts $S_i$, including at least the burst $S_m$ and the burst $S_n$, and for producing each of a plurality of analog signals from each of the plurality of bursts $S_i$;
(ii) an analog-to-digital converter for converting each analog signal to a sampled digital signal, by sampling each analog signal according to a sampling timing;
(iii) an adaptive equalizer for equalizing each sampled digital signal according to each of a plurality of sets of equalizer coefficients to produce an equalized signal, such that a sampled digital signal corresponding to a particular burst $S_i$ is equalized according to a particular set of equalizer coefficients; and
(iv) an equalizer controller for determining each set of coefficients by processing a portion of an equalized signal corresponding to the synchronization portion of a burst $S_i$ according to an initialized coefficient adjustment procedure; such that for processing a portion of an equalized signal corresponding to the synchronization portion of the burst $S_n$, said initialized coefficient adjustment procedure is initialized by adapting a set of coefficients at least partially determined by processing a portion of an equalized signal corresponding to the synchronization portion of the burst $S_m$;

wherein said base station transceiver further comprises:
(v) a transmitter for receiving a digital input, for converting said digital input to an analog signal and for transmitting said analog signal to the terminal station, said transmitter featuring a digital-to-analog converter for converting said digital input to produce said analog signal according to a base station transmission clock;

wherein said sampling timing of said analog-to-digital converter of said base station transceiver is determined directly according to said base station transmission clock; and wherein the system further comprises:
(b) a terminal station transceiver, said terminal station transceiver featuring:
(i) a receiver unit for receiving said analog signal from the base station;
(ii) a symbol timing recovery unit for recovering said base station transmission clock from said analog signal to form a recovered clock;
(iii) an analog-to-digital processing unit for processing said analog signal to a processed digital signal according to said recovered clock; and (iv) a transmitter for receiving a digital input, for converting said digital input to an analog signal and for transmitting said analog signal to the base station, said transmitter featuring a digital-to-analog converter for converting said digital input to produce said analog signal according to said recovered clock.

3. The system of claim 2, wherein said analog-to-digital processing unit features an analog-to-digital converter for converting said analog signal to a sampled digital signal by sampling said analog signal according to a terminal station reception clock, said terminal station reception clock being determined directly according to said recovered clock.

4. The system of claim 2, wherein said analog-to-digital processing unit features:

(1) an analog-to-digital converter for converting said analog signal to a sampled digital signal by sampling said analog signal according to a terminal station reception clock, said terminal station reception clock being determined directly according to a free-running oscillator; and (2) at least one interpolating receive filter for filtering said sampled digital signal directly according to said recovered clock;

and wherein said transmitter features at least one interpolating filter for filtering said digital input directly according to said recovered clock.

5. The system of claim 4, wherein said symbol timing recovery unit features:

(A) a loop filter for determining a timing frequency offset of said sampled digital signal; and (B) an integrator for determining a timing phase shift according to said timing frequency offset;

such that said at least one interpolating receive filter performs an interpolation of said sampled digital signal also according to said timing phase shift.

6. The system of claim 5, wherein said at least one interpolating receive filter performs said interpolation of said sampled digital signal by precomputing a plurality of interpolations according to a plurality of possible phase shifts, and then selecting one of said plurality of interpolations for interpolating said sampled digital signal according to an actual phase shift of said sampled digital signal.

7. A system for communication between a base station and at least one terminal station, the base station receiving a plurality of sequentially transmitted bursts from the at least one terminal station according to a TDMA (time division multiple access) protocol, each burst featuring a synchronization portion, each of the plurality of sequentially transmitted bursts being denoted $S_i$ wherein i is an integer, the plurality of sequentially transmitted bursts including at least a burst $S_m$ and a burst $S_n$ being sent from one terminal station, wherein m and n are each integers and m<n, the system comprising:

a base station transceiver comprising:

(i) a receiver unit for receiving the plurality of bursts $S_i$, including at least the burst $S_m$ and the burst $S_n$, and for producing each of a plurality of analog signals from each of the plurality of bursts $S_i$;

(ii) a digital receiver front-end unit for converting each of said plurality of analog signals to each of a plurality of processed digital signals, a processed signal corresponding to the burst $S_n$ being an $S_n$-corresponding processed signal; and (iii) an automatic carrier frequency control for rotating a phase of said $S_n$-corresponding processed signal according to a phase offset of said $S_n$-corresponding processed signal to produce a rotated signal, said phase offset being determined according to a carrier frequency offset of said $S_n$-corresponding processed signal, said automatic carrier frequency control featuring:

(A) a loop filter for adapting said carrier frequency offset of said $S_n$-corresponding processed signal from a carrier frequency offset determined at least partially from a processed signal corresponding to the burst $S_m$;

wherein an initial carrier phase is assumed at a start of processing said portion of each equalized signal corresponding to the synchronization portion of each burst $S_i$, said automatic carrier frequency control further featuring:

(B) a phase initializer for determining a phase error according to the synchronization portion of said $S_n$-corresponding equalized signal and for correcting said initial carrier phase according to said phase error to determine a correct phase, such that a set of equalizer coefficients being processed according to said synchronization portion corresponding to the burst $S_n$ is also processed according to said correct phase by said initialized coefficient adjustment procedure.

8. A method for communication between a base station and at least one terminal station, the base station receiving a plurality of sequentially transmitted bursts from the at least one terminal station according to a TDMA (time division multiple access) protocol, each burst featuring a synchronization portion, each of the plurality of sequentially transmitted bursts being denoted $S_i$ wherein i is an integer, the plurality of sequentially transmitted bursts including at least a burst $S_m$ and a burst $S_n$ being sent from one terminal station, wherein m and n are each integers and m<n, the base station featuring a base station transceiver, the base station transceiver featuring a receiver unit, an analog-to-digital converter, an adaptive equalizer and an equalizer controller, the method comprising the steps of:

(a) receiving the plurality of bursts $S_i$ by the receiver unit, including at least the burst $S_m$ and the burst $S_n$;

(b) producing each of a plurality of analog signals from each of the plurality of bursts $S_i$;

(c) converting each analog signal to a sampled digital signal by the analog-to-digital converter, by sampling each analog signal according to a sampling timing;

(d) equalizing said sampled digital signal according to said set of equalizer coefficients by the equalizer; and (e) determining each set of coefficients by the equalizer controller by processing a portion of an equalized signal corresponding to the synchronization portion of a burst $S_i$ according to an initialized coefficient adjustment procedure, such that for processing a portion of an equalized signal corresponding to the synchronization portion of the burst $S_n$, said initialized coefficient adjustment procedure is initialized by adapting a set of coefficients at least partially determined by processing a portion of an equalized signal corresponding to the synchronization portion of the burst $S_m$;

wherein the base station transceiver features an automatic carrier frequency control and an equalized signal corresponding to the burst $S_n$ is an $S_n$-corresponding equalized signal, the method further comprising the steps of:

(f) determining a carrier frequency offset of said $S_n$-corresponding equalized signal by said automatic carrier frequency control by adapting said carrier frequency offset of said $S_n$-corresponding equalized signal from a carrier frequency offset determined at least partially from an equalized signal corresponding to the burst $S_m$;

(g) determining a carrier phase offset according to said carrier frequency offset of said $S_n$-corresponding equalized signal; and (h) rotating a phase of said $S_n$-corresponding equalized signal according to said carrier phase offset of said $S_n$-corresponding equalized signal to produce a rotated signal;

wherein each burst features a header and a traffic portion, and said header is the synchronization portion, the method further comprising the steps of:

(i) assuming an initial carrier phase at a start of processing a portion of each equalized signal corresponding to said header of a burst $S_i$;

(j) determining a phase error according to said portion of said equalized signal corresponding to said header of a burst $S_i$;

(k) correcting said initial carrier phase according to said phase error to form a correct phase; and (l) adapting each set of equalizer coefficients according to said correct phase, such that a set of equalizer coefficients employed to equalize a digital sampled signal corresponding to the burst $S_n$ is also processed according to said correct phase by said initialized coefficient adjustment procedure.

9. The method of claim 8, wherein the base station transceiver additionally features a transmitter and the terminal station features a terminal station transceiver, the method further comprising the steps of:

(m) receiving a digital input by the transmitter of the base station transceiver;

(n) converting said digital input to an analog signal according to a base station transmission clock, such that said sampling timing of said base station transceiver for performing the step of converting each analog signal to a sampled digital signal is determined directly according to said base station transmission clock;

(o) transmitting said analog signal to the terminal station;

(p) receiving said analog signal from the base station by the terminal station transceiver;

(q) recovering said base station transmission clock from said analog signal to form a recovered clock;

(r) processing said analog signal to a processed digital signal according to said recovered clock, said processed digital signal being output from the terminal station transmitter;

(s) receiving a digital input into the terminal station transceiver;

(t) converting said digital input to an analog signal according to said recovered clock, such that said sampling timing of the base station transceiver has a substantially identical frequency as said recovered clock; and (u) transmitting said analog signal to the base station.

10. The method of claim , wherein the step of processing said analog signal to said processed digital signal by the terminal station transceiver further comprises the step of:

(i) converting said analog signal to a sampled digital signal by sampling said analog signal according to a terminal station reception clock, said terminal station reception clock being determined directly according to said recovered clock.

11. The method of claim 9, wherein the step of processing said analog signal to said processed digital signal by the terminal station transceiver further comprises the steps of:

(i) converting said analog signal to a sampled digital signal by sampling said analog signal according to a terminal station reception clock, said terminal station reception clock being determined directly according to a free-running oscillator; and (ii) interpolating said sampled digital signal directly according to said recovered clock;

and wherein the step of converting said digital input to an analog signal is performed by interpolating said digital input according to said recovered clock.

12. The method of claim 11, wherein the step of interpolating said sampled digital signal further comprises the steps of:

(1) determining a symbol timing frequency offset of said sampled digital signal;

(2) determining a symbol timing phase shift according to said symbol timing frequency offset; and (3) performing an interpolation of said sampled digital signal also according to said symbol timing phase shift;

and wherein the step of interpolating said digital input further comprises the step of adjusting a phase of said digital input according to said symbol timing phase shift.

13. The method of claim 12, wherein the step of performing said interpolation of said sampled digital signal further comprises the steps of:

(A) precomputing a plurality of interpolations according to a plurality of possible symbol timing phase shifts; and (B) selecting one of said plurality of interpolations for interpolating said sampled digital signal according to an actual symbol timing phase shift of said sampled digital signal.

14. The method of claim 13, wherein the step of adjusting a phase of said digital input according to said phase shift further comprises the steps of:

(1) precomputing a plurality of interpolations according to a plurality of possible symbol timing phase shifts; and (2) selecting one of said plurality of interpolations for interpolating said digital input according to an actual symbol timing phase shift of said digital input.

* * * * *